US007919994B2

(12) United States Patent
Walker et al.

(10) Patent No.: US 7,919,994 B2

(45) Date of Patent: Apr. 5, 2011

(54) RECEPTION COMPARATOR FOR SIGNAL MODULATION UPON A SUPPLY LINE

(75) Inventors: Thomas Walker, Kusterdingen (DE); Herman Jalli Ng, Linz (AT)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 12/569,079

(22) Filed: Sep. 29, 2009

(65) Prior Publication Data

US 2010/0085101 A1 Apr. 8, 2010

(30) Foreign Application Priority Data

Oct. 2, 2008 (DE) ........................ 10 2008 042 557
Nov. 28, 2008 (DE) ........................ 10 2008 044 147

(51) Int. Cl.
*H04L 7/033* (2006.01)

(52) U.S. Cl. ........................................ 327/98; 329/347

(58) Field of Classification Search .................... 327/98, 327/306; 329/347
See application file for complete search history.

(56) References Cited

U.S. PATENT DOCUMENTS 4,987,297 A * 1/1991 le Squin et al. .......... 250/227.21
7,265,610 B2 * 9/2007 Enguent ........................ 329/347
7,439,800 B2 * 10/2008 Conraux ....................... 329/347

* cited by examiner

*Primary Examiner* — Lincoln Donovan
*Assistant Examiner* — William Hernandez
(74) *Attorney, Agent, or Firm* — Kenyon & Kenyon LLP

(57) ABSTRACT

The present invention relates to a wire-bound transmission of data, as occurs, for example, between a sensor and a control unit. In order to save lines, both the supply voltage and the data signal to be transmitted are transmitted over the same line. The field of the present invention relates to the extraction of data signals from the supply voltage line.

11 Claims, 5 Drawing Sheets

RECEPTION COMPARATOR FOR SIGNAL MODULATION UPON A SUPPLY LINE

CROSS REFERENCE

The present application claims the benefit under 35 U.S.C. §119 of German Patent Application No. 102008042557.5 filed on Oct. 2, 2008, and German Patent Application No. 102008044147.3 filed on Nov. 28, 2008, both of which are expressly incorporated herein by reference in their entireties.

FIELD OF THE INVENTION

The present invention relates to a wire-bound transmission of data, as occurs, for example, between a sensor and a control unit. In order to save lines, both the supply voltage and the data signal to be transmitted are transmitted over the same line. The field of the present invention relates to the extraction of data signals from the supply voltage line.

SUMMARY

Conventionally, the data are transmitted using pulses, preferably square-wave pulses, which are superposed on the supply voltage. In the transmission technology PSI5 (peripheral sensor interface 5), a two-wire line is used, for example, which is used for connecting remote sensors to electronic control units. In the transmission using a PSI5 interface, a low-pass filter having a very large time constant is used, which compensates for a fluctuating direct current component which comes about due to slow voltage changes in the voltage phase. The low-pass filter is developed as an RC circuit, the capacitor being able to have a large value, since with respect to the pulse width of the voltage modulation. The capacitor may be provided as external capacitor, since an integrated solution could possibly require too great an SI area. Integrating the capacitor or a very high-resistance resistor leads to increased production costs and component costs. In addition, because of the large time constant, charging and discharging before each data reception becomes necessary in an initialization phase. Consequently, the maintenance is ready for operation only after a certain time period.

It is one object of the present invention to provide a receiver circuit and an associated reception method, using which one is able to lower the costs and the time for initialization, and besides that, the pulse width should not determine the time constant. An additional object of the present invention is that the pulse width may also be determined and that not only a pulse recording takes place.

An example embodiment according to the present invention may be implemented using a cost-effective and simple circuit, requires no adjustment to fluctuations, that are difficult to detect, of the current supply network and is able to be taken into operation directly and without waiting time. The example embodiment of the present invention makes possible the reception of data transmitted via a voltage supply, for instance, via a voltage supply inside a motor vehicle. The example embodiment of the present invention is particularly suitable for transmitting data via a voltage supply line which is fed by a vehicle electrical system of a motor vehicle, directly or via a control unit. The example embodiment of the present invention makes possible the transmission of data from a control unit to an external sensor and from an external sensor to a control unit, which are being used in a motor vehicle. The example embodiment of the present invention is especially suitable for the transmission of data modulated upon a DC voltage, the DC voltage not being bound to a fixed value, in this instance. The example embodiment of the present invention does not require any type of filter for separating the DC voltage component from the modulated control signal, and is thus able to be constructed using a minimum of energy stores, such as coils and capacitors, which are difficult to handle, particularly during integration into an integrated circuit. Tracking a voltage fluctuation, not caused by signal modulation, is made possible by the example embodiment of the present invention without a specified time constant, the tracking speed being able to be designed higher by a multiple than in receivers according to the related art, in which a serial capacitive coupling is used for separating the DC voltage component. In principle, this makes possible a clearly higher data rate, in addition, the time constant provided according to the example embodiment of the present invention being able to be adjusted only to a known pulse width or to a known pulse width interval. The example embodiment of the present invention makes possible a particularly high integration density, and makes no great demands on the accuracy of component values. The example embodiment of the present invention requires no discrete components except for an integrated circuit.

The example embodiment of the present invention provides for recording the modulated upon data signal using comparators, the comparators not working with a fixed voltage reference as threshold value, but having threshold values that change with the voltage supply. Comparators are provided for separating the modulated upon signals which, for one, receive a signal derived from the supply voltage as well as a signal that is also derived from the supply voltage, but has been low-pass filtered in addition. In particular, two comparators are used, one comparator for recording an high level (more precisely: a rising edge leading to an high level) of the modulated upon signal, and a comparator for detecting the low level (more precisely: a falling edge leading to a low level) of the modulated upon signal.

For this, a supply potential terminal and a ground potential terminal are provided, at which the completely modulated voltage is present. A low-pass filter as well as the comparators obtain their input signal from the supply potential terminal and the ground potential terminal, preferably via a voltage divider, which divides the voltage that is present between the supply potential terminal and the ground potential terminal. The comparators consequently receive a low-pass filtered signal that corresponds to the supply voltage that was divided using the voltage divider. On the other hand, the comparators are provided with a respective threshold value that is derived from the supply potential without low-pass filtering, for instance, fed to the respective comparator via a first input, whereas a second input is connected to the terminal of the low-pass filter, in order to record the low-pass filtered signal of the voltage divider. This puts one into a position of incorporating low-voltage components into the signal chain relatively early in an area-saving manner. According to the example embodiment of the present invention, the threshold values are generated by a respective threshold value generator, which adjusts the corresponding threshold value according to the output signal of the comparator. At each exceeding or undershooting of the respective threshold value, this yields additional increases or decreases of the respective threshold value, whereby the threshold value that has just been undershot or exceeded is removed further from the current reception signal. Therefore, at each exceeding or undershooting of a threshold value of a comparator, a stable state comes about, the dropping off or the raising of the threshold value preventing the exceeding or undershooting of the threshold value which result from errors or voltage jumps in the supply voltage. Thus, the example embodiment of the present invention is focused upon recording the exceeding or undershooting of threshold values, the adjusting of the threshold value and this focusing leading to the fluctuations of the supply voltage, which do not originate with a specific signal modulation, having no influence on the result. On the one hand, because of the absolute amount of the dropping or the absolute amount of the raising, the example embodiment of the present invention is able to be adjusted to the amplitude fluctuations by signal modulation, so that smaller fluctuations of the supply voltage, which are not a part of the signal modulation, do not enter into the result. On the other hand, the low-pass filter is able to be adjusted to the pulse width of the signal modulation, so that, even with respect to the time characteristic, the recording is focused on the modulation itself, and changes in the supply voltage deviating time-wise from it are able to be separated from it, and do not enter into the result.

A voltage divider circuit is preferably provided for each comparison, whose two outer terminals are connected to supply potential and supply ground. Thus, each voltage divider circuit divides the supply voltage that is present between the supply potential terminal and the ground potential terminal. The comparators are supplied with their threshold values via the voltage dividers, so that a threshold value input of a comparator is connected to the respective voltage divider circuit, particularly to a pickup of the voltage divider circuit between the supply potential and the ground potential. In addition, at the voltage divider circuit of each comparator, an associated threshold value generator is preferably connected, so that the threshold value generator is able to influence the threshold value via the voltage divider circuit. According to one first range of vision, the threshold value generator is outside the voltage divider, and connected to it, the voltage divider being connected to the threshold value input of the respective comparator, so that the threshold value generator is able to influence the threshold value input of the comparator. According to another way of looking at it, however, a part of the threshold value generator is implemented by the voltage divider circuit, since it combines the divided supply voltage with an outer threshold value input. According to this range of vision, a part of the threshold value generator is provided by the voltage divider circuit, since the voltage divider circuit contributes to the adjustment of the threshold value in that the divided supply voltage changes the threshold value using an external signal (that is, external to the voltage divider circuit).

The voltage divider circuit is preferably provided by four resistors connected in series, whose external terminals are connected to the supply voltage, and whose intermediary pickups, for one thing, are provided for connection to the respective threshold value inputs, an additional connection being provided for inputting an external signal which changes the threshold value. Alternatively, the voltage divider circuit may also be provided having three resistors, the resulting two pickups being used for one, for connection to the threshold value input of the comparator, and for another, for connection to an external signal which changes the threshold value. All the voltage dividers of the comparators are preferably identical, and they possibly differ only by the wiring configuration of their tapping or their pickups. In addition, a voltage divider is provided for the low-pass filter, which preferably has the same dividing ratio as the voltage dividers of the comparators.

The low-pass filter-voltage divider circuit includes a series resistor, as well as a parallel resistor which is connected in parallel to a capacitor of the low-pass filter. The parallel resistor, on the one hand, forms a low-pass filter together with the capacitor, and on the other hand, forms a voltage divider together with the series resistor. The resistors of the low-pass filter-voltage divider preferably behave in proportion to the voltage divider circuits of the comparators, with reference to the pickup that is connected to the threshold value input of the comparator. The resistance values of the series resistor and of the parallel resistor may also correspond to the resistance values of the voltage divider circuit of the comparator, which connect the tapping, that is connected to the threshold value input of the comparator, to the supply potential terminal or to the ground potential terminal.

The result output by the comparator is preferably stored temporarily using a storage element The storage element preferably includes as many inputs as there are comparators whose result is to be stored. Although the present invention is particularly suitable for binary signals, that is, for a multi-stage signal having exactly two different levels (high and low), the principle according to the present invention may basically also be used for value-discrete signals which are modulated upon the supply voltage in the form of at least three levels. However, a two-stage signal is preferably modulated upon the supply voltage, so that the storage element includes inputs, to be sure, one input being connected to one comparator (the high comparator) and one input being connected to the second comparator (the low comparator). The connection may be provided to be direct, or it may be provided via a glitch filter, in order to filter or suppress interferences on supply voltage lines. The storage memory is preferably a flip-flop, especially an RS flip-flop, the S input (the set input) being connected to the output of the high comparator, and the R input (the reset input) of the RS flip-flop being connected to the output of the low comparator. The glitch filters are necessary, in this context, in order to avoid inadmissible inputs to the R and S inputs. The glitch filters are only optional, and may, for instance, also be replaced by low-pass filters, or may be implemented by an appropriate circuit of a JK flip-flop (which then also provides the storage element). Besides glitch filters, logical combination circuits may also be provided which, for instance, in the case of inadmissible inputs, link the two signals of the comparators to each other in such a way that an admissible input signal for the RS flip-flop is yielded. The comparators are preferably supplied by the supply voltage, and the storage element as well, and possibly associated combination circuits or the glitch filters are supplied with the supply voltage.

In the case of a binary receiving stage or a binary receiving method, the high comparator and the low comparator may be developed as comparators or as operational amplifiers, preferably as two comparators or two operational amplifiers, each having two inputs. Each comparator preferably has a non-inverted and an inverted input respectively. The non-inverted input of the high comparator is preferably the high threshold value input, the inverted input being the receiving signal terminal that is connected to the low-pass filter voltage divider. The non-inverted input of the low comparator preferably forms the receiving signal input of the low comparator, and is connected to the low-pass filter-voltage divider circuit or with the low-pass filter. The inverted input of the low comparator is connected to the low voltage divider and thus forms the low threshold value input. The prefix high and low relates to components which record an edge leading to an high level (high component) or an edge leading to a low level (low component).

The threshold value generator is preferably connected, via the voltage divider circuit of the associated comparator, to the comparator or to the threshold value input of the comparator. In principle, only one threshold value generator is able to be provided for both (or for all) threshold value inputs, preferably, however, one threshold value generator being provided for each comparator. In principle, the threshold value generator may be connected to the associated comparator via a coupling circuit, in one preferred specific embodiment a part of the voltage divider circuit, that is associated with the comparator, providing the coupling circuit. The coupling circuit enables the supplying of an external signal that changes the threshold value, that is, the signal of an (external) threshold value generator, the coupling circuit mixing this signal with the supply voltage signal (i.e. the divided supply voltage signal).

The threshold value generator includes a feedback circuit, which receives its input signal from the output of the associated comparator, as well as preferably a driver stage which feeds the signal, fed back from the output of the comparator, to the associated coupling circuit, and thus changes or provides the threshold value of the comparator. This achieves that there is always a sufficient signal-to-noise ratio to the respective input comparators when the two input signals approach, so that a comparator oscillation is avoided. The driver stage may be a digital or analog driver stage, a controllable current source or a controllable voltage source. A driver stage is preferably used which emits a binary signal as a function of its input, that is, a signal that knows essentially two level states. For a lower input voltage interval, other driver stages may, for instance, supply only a low current, and, as of an input voltage that is above the lower interval, may rise with the input voltage, preferably at high sensitivity, in order to provide an upper level as of the beginning of an upper input voltage interval. The driver stage may be provided by a double inverter circuit, by a non-inverting driver circuit, by an emitter follower circuit or by a collector follower circuit. The output signal of the comparator (or rather, of each comparator) is thus fed back via a driver stage to the threshold value input of the comparator, the driver output signal being combined with a signal, for instance, by adding, which is derived from the supply voltage. The signal derived from the supply voltage is preferably the signal at a tapping of the associated voltage divider circuit. The driver stage is preferably supplied with electric power from the supply voltage.

The feedback preferably takes place in that the driver is controlled by the output of the associated comparator, and the output signal of the driver is fed into the voltage divider circuit (i.e. the low voltage divider circuit or the high voltage divider circuit). For this purpose, the voltage divider circuit preferably includes a tapping feedback which differs from the tapping that is connected to the threshold value input of the comparator, whereby the threshold value is provided, on the one hand by the voltage divider (and thus, by the supply voltage), and on the other hand by the fed-back comparator signal. Instead of a feedback circuit, which uses the output of the comparator, an additional circuit may be provided which emits a signal that emits a comparison result between supply voltage (or a signal modified from it) and the low-pass filtered signal, in order to change the threshold value according to the comparison result via a combination circuit that is connected to a threshold value input of a comparator.

In one particularly simple specific embodiment, the low-pass filter is provided by the capacitor to which a parallel resistor is connected. Together with the series resistor that is connected to the capacitor and to the parallel resistor, the low-pass filter on the one hand is provided, and on the other hand the low-pass filter-voltage divider circuit is provided. The end of the series resistor not connected to the capacitor is connected to the supply potential terminal, whereas the ends of the parallel resistors and the capacitors that are not connected to the serial resistors are connected to the ground potential terminal. The linkage point between the capacitor, the parallel resistor and the plain resistor forms, together with the ground potential terminal (or even together with the supply potential terminal) the output of the low-pass filter, which is connected to the reception signal inputs of the comparators. Basically, instead of a low-pass filter of the first order, a low-pass filter of an higher order may also be formed. The time constant of the low-pass filter of the first order, formed by the parallel resistor and the capacitor, is given by the product R×C, this time constant reflecting the rate of rise in the case of an input signal step. The time constant is preferably adjusted to the pulse duration of the modulated upon signal, so that the low-pass filter and the entire reception stage is able to respond optimally to the modulated upon signal. The time constant of the low-pass filter (of the first order, for example) is of the same order of magnitude as the pulse width of the signal, and amounts preferably to a maximum of 10%, of 20%, of 30%, of 50%, of 75%, of 100%, of 150% or of 200% of the pulse width. Especially preferred are low-pass filters (of the first order) having a time constant that corresponds to 10-40% and preferably 15-30% of the length of a pulse of the modulated signal. Thus, by the dimensioning of the low-pass filter, the receiving stage is able to be adjusted to the modulated signal that is to be expected. In the same way, the threshold value generators are able to be adjusted to the modulated upon signal, by raising or lowering the threshold value by an absolute amount that corresponds to the order of magnitude of the voltage range of the modulated signal. The amount preferably corresponds to between 10% and 300%, preferably between 20% and 100% and particularly preferably between 25% and 75% of the voltage range of the signal that is modulated upon the supply voltage.

The present invention includes an example receiving stage according to the present invention, as well as an example method according to the present invention for receiving the modulated upon signal. The method steps of the low-pass filter are carried out by the low-pass filter, the steps of the comparator are carried out by the comparisons of the receiving stage, and the threshold values are adjusted by the threshold value generators which raise or lower the threshold value according to the result of the comparison. The voltage dividers or voltage divider circuits of the comparators have the task, on the one hand, to divide the supply voltage and, on the other hand, to combine the outputs of the threshold value generators with the divided voltage, so as to provide the threshold value and so as thus to raise or lower the threshold value according to the result of the comparison. The results are stored by the storage element, which may possibly link the results logically with one another and furthermore stores the linked result. The low-pass filtering is preferably carried out according to the properties of the low-pass filter, and the comparison and the generation of the threshold values is carried out according to the comparators or the threshold value generators.

The supply voltage, together with the modulated multi-stage signal is present combined as voltage difference between the supply potential terminal and the ground potential terminal. Thus, as the terminal voltage, the combined voltage of supply voltage and modulated signal is provided, the terminal voltage corresponding to the voltage difference that is present between the supply potential terminal and the ground potential terminal.

As was noted before, the present invention is suitable for the transmission of data within a DC vehicle electrical system, especially of motor vehicles. The present invention is particularly provided for transmitting data from a sensor to a control device, the control device supplying the sensor with electric power, i.e., with DC voltage, through the same connection that is also provided for transmitting data from the sensor to the control unit. However, the signals may basically be provided at any components desired, for instance, at the sensor, in order to receive control data from the control unit. In addition, the control unit may, in principle, not only communicate with the sensor but also with other components, such as other vehicle components. It is possible to have data transmission over the entire vehicle electrical system, for instance, data transmission from a control unit of a motor vehicle to an additional electrical motor vehicle component, for instance, to an actuator such as a fan, a heating element or the like. The present invention may also be implemented by a control unit having a receiver according to the present invention, or by a sensor or an actuator component within the motor vehicle having a receiver according to the present invention.

BRIEF DESCRIPTION OF THE DRAWINGS

Exemplary embodiments of the present invention are shown in the figures and described in greater detail below.

DETAILED DESCRIPTION OF EXAMPLE EMBODIMENTS

Figure 1:
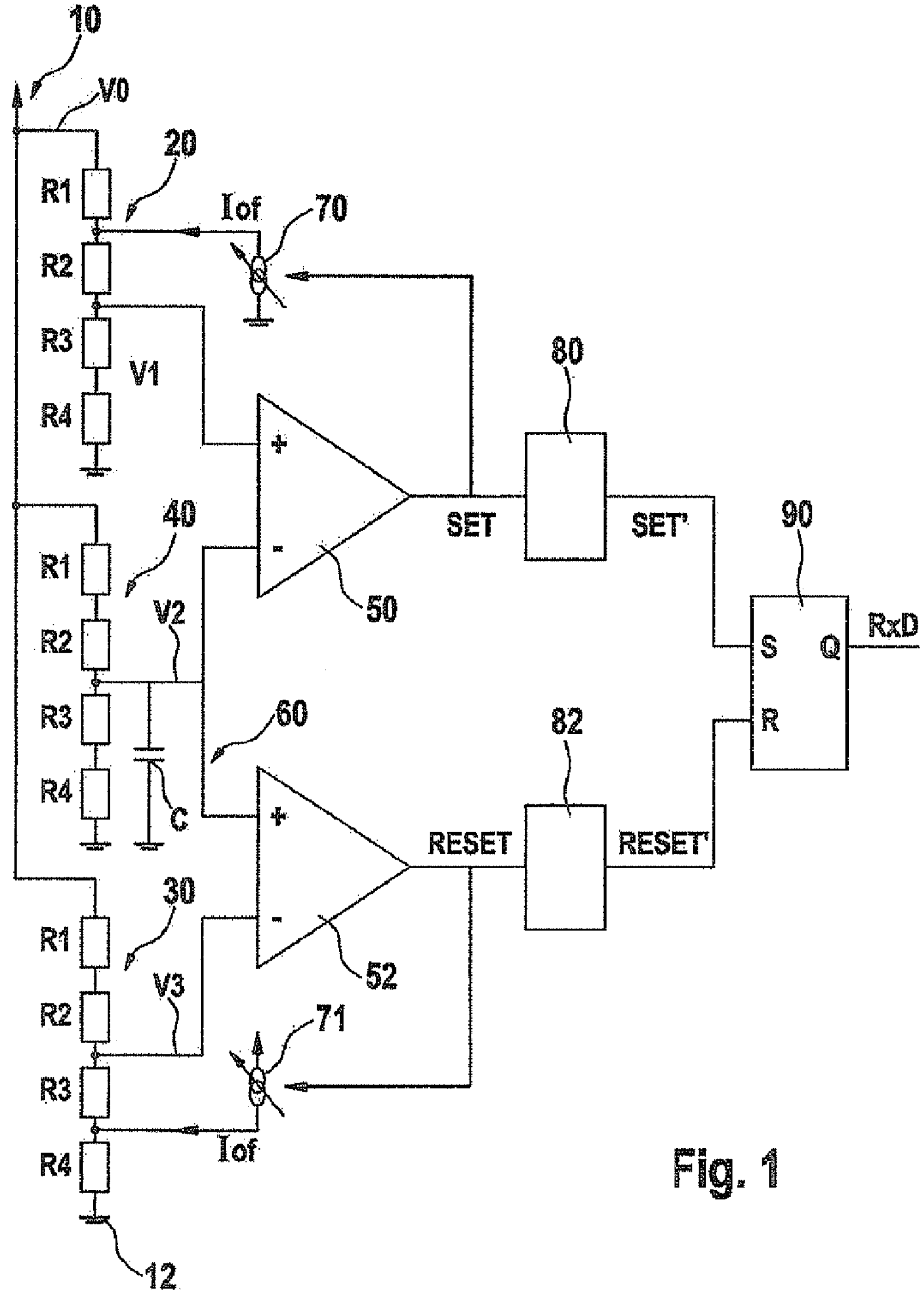
FIG. 1 shows an example embodiment of the receiver circuit according to the present invention.

FIG. 1 shows a circuit diagram having an example embodiment of a receiving stage according to the present invention. The receiving stage includes a supply potential terminal 10, V0, and a ground potential terminal 12, between which the supply voltage is present having modulated multi-stage signals or the terminal voltage. The circuit of FIG. 1 includes a first voltage divider 20, a second voltage divider 30 and a third voltage divider 40. Voltage dividers 20, 30 and 40 may be developed to have the same resistance values. For the better representation of the divider ratio, the voltage dividers include resistors R1-R4.

The circuit also includes two comparators 50, 52, i.e., an high comparator 50 and a low comparator 52. The non-inverted input of high comparator 50 is used to input high threshold values V1, and is connected to high voltage divider 20. High threshold value V1 is used for detecting the edge leading to the high level, and is the lower threshold value of the two threshold values V1 and V3. Thus, between resistors R2 and R3, the threshold value tapping for V1 is provided.

In the same way, the inverted terminal of comparator 52 is connected for detecting low threshold value V3 using a threshold value tapping between R2 and R3 of low voltage divider 30. Low threshold value V3 is used for detecting the edge leading to the low level, and is the upper threshold value of the two threshold values V1 and V3.

Voltage divider 40 includes a tapping which is connected, on the one hand, to the inverted input of high comparator 50, that is, with its receiving signal input, as well as to the non-inverted input of low comparator 52, that is, to the input signal input of low comparator 52. Furthermore, a capacitor C is connected to voltage divider 40, which forms an RC element with resistors R3+R4 as parallel resistance and R1+R2 as series resistance. Consequently, V2 designates, for one, the signal of the receiving signal inputs of comparators 50 and 52, and for another, the output of the low-pass filter that is formed by C and R3+R4. The time constant of low-pass filter 60 is calculated by ((R1+R2)||(R3+R4))×C.

The output of high generator 50, SET, is conducted to an high threshold value generator 70, and the output of low generator 52, RESET, is passed on to a low threshold value generator 71. The current flow directions of the threshold value generators are shown to be the same in FIG. 1, for the sake of better clarity, that is, into the voltage dividers, the current flow direction of high threshold value generator 70, however, being preferably directed towards the output of the high comparator (negative current flow), while the current flow direction of low threshold value generator 71 is preferably directed towards low voltage divider 30 (positive current flow). The currents generated by the threshold value generators thus preferably have opposite signs. Threshold value generators 70, 71 are provided as switchable current sources (cf. FIG. 4 and associated description), which, in turn, are connected to a tapping of low voltage divider 30 and high voltage divider 20. The corresponding tapping is designated as feedback tapping. Between feedback tapping (between R1 and R2 or between R3 and R4) threshold value tapping V1 and V3, in each case a resistor (R2 or R3) of the respective voltage divider circuit is inserted. Via this resistor, threshold value generator 70, which is a function of the comparison results of comparators 50, 52, influences low threshold value V3 or high threshold value V1. The switchable current sources which, together with parts of the voltage divider circuit connected to them form the threshold value generators, impress an offset current Iof on the respective voltage divider circuit, at the feedback tapping. Thereby the potential of threshold values V1 and V3 is also changed.

Signal V2 compared with that is dependent on the time constant as follows:

$$V2=V0\times[(R3+R4)/(R1+R2+R3+R4)]/(1+j\omega r),$$

where r=Cx(R1+R2)||(R3+R4). The variables Iof and R1, R2, R3 and R4 that are determining for the generation of triggering thresholds and the ratio of resistors R1, R2, R3 and R4 to one another, Iof und R1, R2, R3 and R4 of the high voltage divider and Iof and R1, R2, R3 and R4 of the low voltage divider are preferably designed in such a way that the high threshold value and the low threshold value are symmetrical to each other. The voltage falling off at R1 of high voltage divider 20 preferably corresponds to the voltage falling off at R4 of low voltage divider 30, when SET and RESET have the same level, that is, both in the case of active current sources 70, 71 (both active) and in the case of inactive current sources 70, 71 (both inactive where Iof=0).

The outputs of the comparators, i.e., SET, RESET are each given off via an optional glitch filter 80, 82, in order to filter out interferences, such as in the form of voltage peaks, in particular also interferences in the supply line. The filtered signals are output by the glitch filters as SET' and RESET'. These are input to SET input S and RESET input R of an RS flip-flop 90, which functions as a storage element. The output of RS flip-flop 90, Q corresponds to the signal R×D, and reproduces the modulated upon signal (time-delayed by glitch filters 80, 82.

Figure 2:
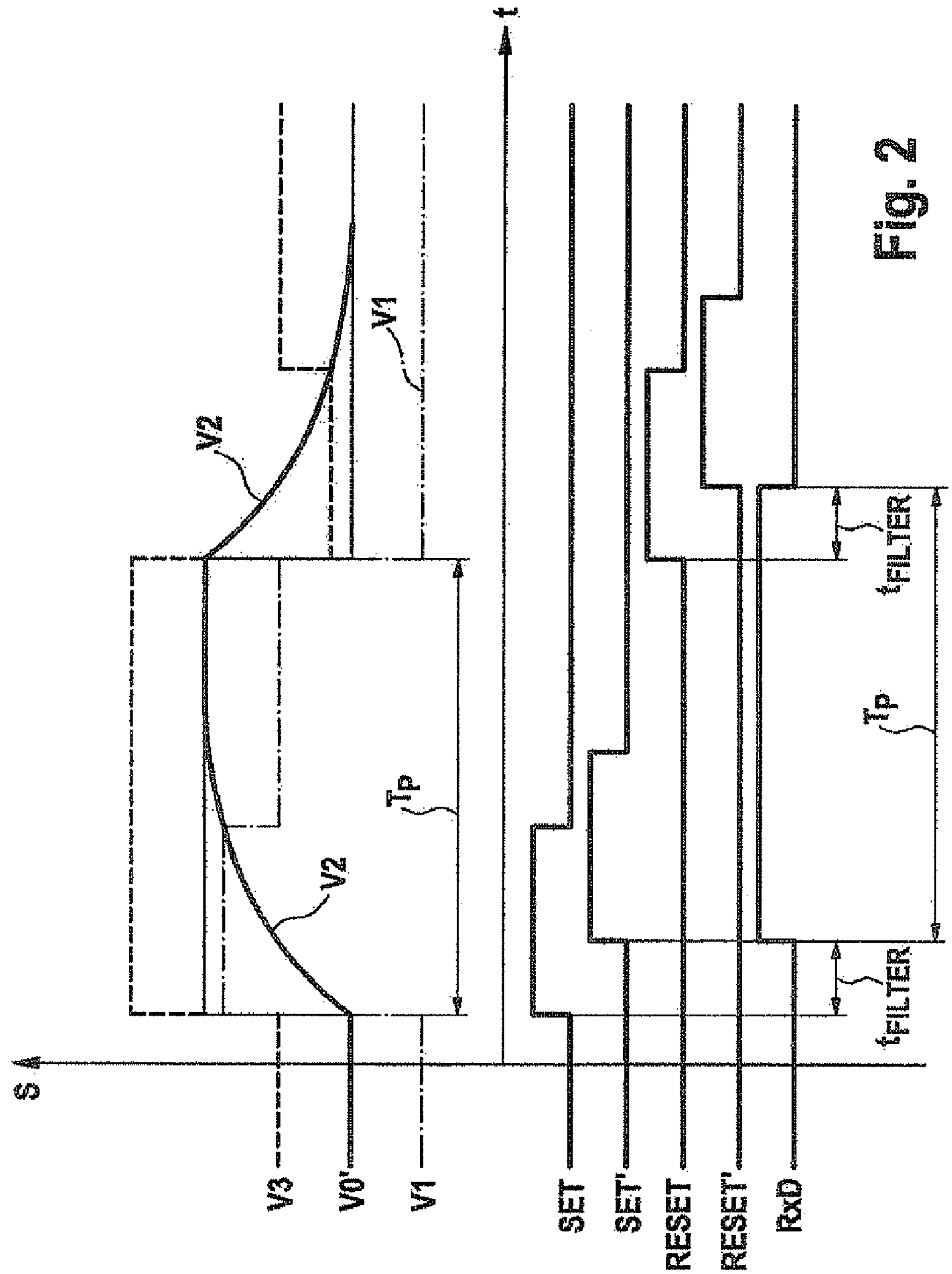
FIG. 2 shows the signal curve during the execution of the example method according to the present invention.

FIG. 2 shows the individual signals, as they occur during the execution of the method according to the present invention, over time T. The curves shown refer to the operation of the circuit shown in FIG. 1, and the signal designations are therefore identical.

First, we show the two threshold values V3 and V1, see broken lines V3 and V1, V1 corresponding to the high threshold value and V3 to the low threshold value. The prefixes "high" and "low" do not relate, in this case, to the level of the threshold values or the level ratios between the threshold values, but to the clock pulse edges that relate to the respective level states of the modulated signals. The high threshold value is thus relevant for recording the edges that lead to the high level of signal V0', and the low threshold value is thus relevant for recording the edges that lead to the low level of signal V0'. In FIG. 2, high threshold value V1 is the lower threshold value and low threshold value V3 is the upper threshold value.

V0' corresponds to an uninfluenced voltage-divided terminal voltage V0, where V0'=V0×(R3+R4)/(R1+R2+R3+R4). Moreover, FIG. 2 shows the curve of the low-pass filtered signal that corresponds to the output signal of the low-pass filter that has V0' (or V0) applied to it. According to the modulation at the beginning of time interval $T_p$, V0' shows a rising edge and a corresponding falling edge at the end of interval $T_p$. This modulation reflects an information element that was modulated upon by a sender. According to the time constant, V2 rises with the clock pulse edge and approaches the upper level of V0', starting from the lower level of V0'. Meanwhile, threshold values V1 and V3 are constant up to the threshold value, until low-pass filtered signal V2 (=receiving signal of the comparators) reaches a threshold value of the two comparators, in this case, high threshold value V1. When it reaches this threshold value, the high comparator tips the output value from 0 to 1 (or from a corresponding lower level to an upper level), whereby the high threshold value generator lowers the high threshold value (both for recording the edge leading to the high level). This is achieved by switchable current source 70, compare FIG. 1, transits from an offset current IOF1 to a second current IOF, and thus lowers the potential of high threshold value V1 to ground. In FIG. 2, this voltage drop is shown as an abrupt falling edge, in a specific embodiment not shown, the lowering (and thus also the rising) of the threshold values is performed continuously, for instance, using a low-pass filter of an integrator, of a specified curve in time, or the like. At the same time, low threshold value V3 remains constant, since it was not exceeded. At the beginning of time interval $T_p$, high threshold value V1 and also low threshold value V3 rise with voltage V0', which derives from terminal voltage V0.

In the same way, threshold values V1 and V3 drop when the level of V0' drops to a lower level at the end of $T_p$. Because of the drop at the end of $T_p$, the two threshold values drop by the same amount, the low-pass filtered signal V2 following according to the time constant of the falling edge. After the falling edge at the end of interval $T_p$, when voltage V2 reaches threshold value V3, low threshold value V3 is undershot, so that the output of comparator 52, RESET, goes to an high level, and thus sets the switchable current source of low threshold value generator 71 to a different value. The low threshold value is thereby lifted towards a supply potential V0, according to Iof of current source 71 and the associated resistors of low voltage divider 30, so that V3 is raised again when V2 falls below V3.

The associated output signals of comparators 50 and 52 and glitch filters 80 and 82 are also shown in FIG. 2. First of all, the SET output of comparator 50 rises, whereupon, delayed by glitch filter 80, signal SET' rises after time $t_{FILTER}$. With the increase of high threshold value V1, the output signal of comparator 50 is set to an high level, since V2, that is, the receiving signal at the receiving signal input, lies below low threshold value V1. This is the case until V2 reaches high threshold value V1, whereupon the output of high comparator 50 drops again to a low level. In the same way, at the end of interval $T_p$, the output signal of low comparator 52, RESET, is set to an high level, since V2 lies above V3 at the end of $T_p$. The reason for this is the abrupt drop of V3 at the end of $T_p$. Signals SET' and RESET' are delayed with respect to signals SET, RESET via glitch filters 80, 82. The duration of the delay corresponds to $t_{FILTER}$. The signal yielded at the output of RS flip-flop 90 is represented by R×D, and, with regard to its curve, corresponds to the curve of the signal of V0, except for a delay of $t_{FILTER}$, which was caused by glitch filters 80, 82. Consequently, the curve of the modulated signal is reproduced by the output signal of the RS flip-flop 90, R×D. The difference in level of the output signals of the comparators, the glitch filters and the RS flip-flops is determined solely by the supply voltage, and the output signal of the flip-flop 90, R×D, has only two levels.

Consequently, if the information that is to be transmitted resides in the pulse width, both the rising and the falling edge have to be evaluated. This is made possible by the use of the RS flip-flops and by the formation of the upper and lower trigger thresholds. If the voltage difference between supply potential terminal and ground potential terminal (=the terminal voltage) increases by more than the trigger threshold, the RS flip-flop is set; when the terminal voltage falls below the trigger threshold again, the RS flip-flop is reset. One may also see in FIG. 2 that the low-pass filter delays the curve of signal V2 compared to signal V0' according to the charge and discharge process of the energy store (=capacitor C). Since the time constant is adjusted to the (short) pulse width (and not to slowly fluctuating, basic supply voltages), capacitor C may be provided to be very small, preferably in the picoFarad range (such as <1 μF, <100 nF, <10 nF or <1 nF) or less, in order to be implemented with the remaining circuit into an integrated circuit. It should be noted that the capacitance values in the nanoFarad range and greater are able to be integrated only at very high area expenditure, if at all. The time constant achieved thus depends on the relatively short pulse width, which is clearly shorter than the time constant at receivers of the related art, which depends on the fluctuation speed of the supply voltage.

The thresholds shown in FIG. 2 are preferably symmetrical with respect to V0' (provided the respective thresholds were not undershot or exceeded), so that the two currents Iof of current sources 70 and 71 are preferably equal in absolute value, or the amounts are selected so that they, together with the resistance values of the associated voltage dividers, generate the same voltage difference with respect to V0 and to ground, when they are activated. The voltage difference is used for the adjustment of the threshold values, according to the example embodiment of the present invention. Furthermore, the ratio of R1+R2 to R3+R4 is the same in the high voltage divider as in the low voltage divider. Moreover, the activation thresholds of the voltage sources are preferably identical, and are a function, for example, only of a bandgap voltage of a driver transistor.

FIG. **3*a* shows the curve of the output signal of comparator 50, SETs, together with threshold values V1 and V3 and (voltage-divided) terminal voltage V0'. The lowest shown signal is delayed by $t_{FILTER}$, this time duration being caused by the (optional) glitch filter. It is shown that the pulse width of the SET signals is longer than $t_{FILTER}$, the pulse width of the SET signals being yielded by the rate of rise, and thus by the time constant of the low-pass filter, as well as by the associated rise of threshold value signal V1 at a rise of V0'**. Based on the longer duration of the high state of the SET signal, the level increase is transmitted all the way through the glitch filter.

By contrast, FIG. **3*b* shows a short high signal of V0'**, so that, because of the level change at the beginning of $t_{FILTER}$, it is true that a SET signal is generated, which, however, is not long enough to get through the glitch filter. The output of glitch filter SET' thus does not take over the pulse change of SET. In this way, short voltage peaks, which could erroneously be taken to be modulation events, are able to be distinguished from actual modulations by adjusting the time duration of the glitch filter and also the time duration of the low-pass filter to the pulse width of the modulated signal. Doing this particularly increases the electromagnetic compatibility of the receiver.

Figure 3A:
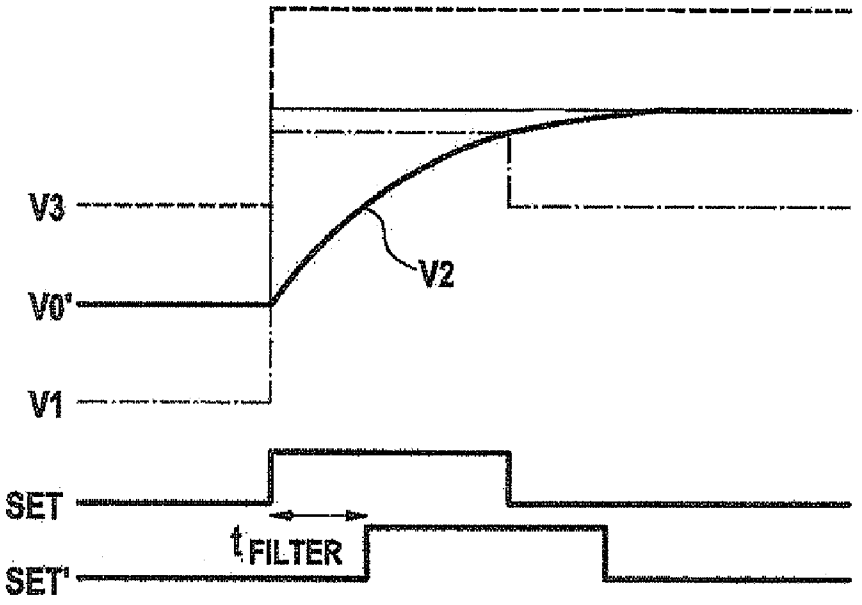
FIGS. 3*a*-3*d* show the signal curve in response to applications of the example method according to the present invention, under various conditions.
Figure 3B:
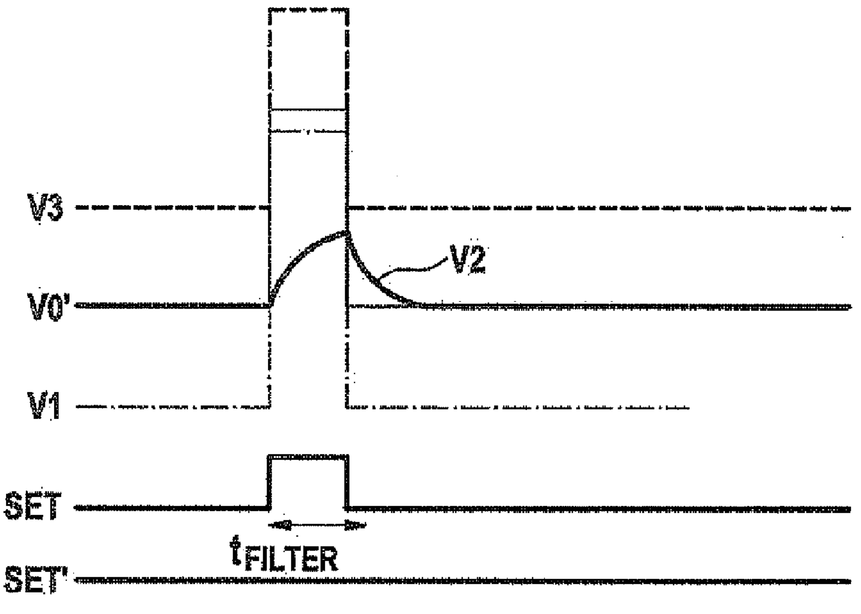
Figure 3C:
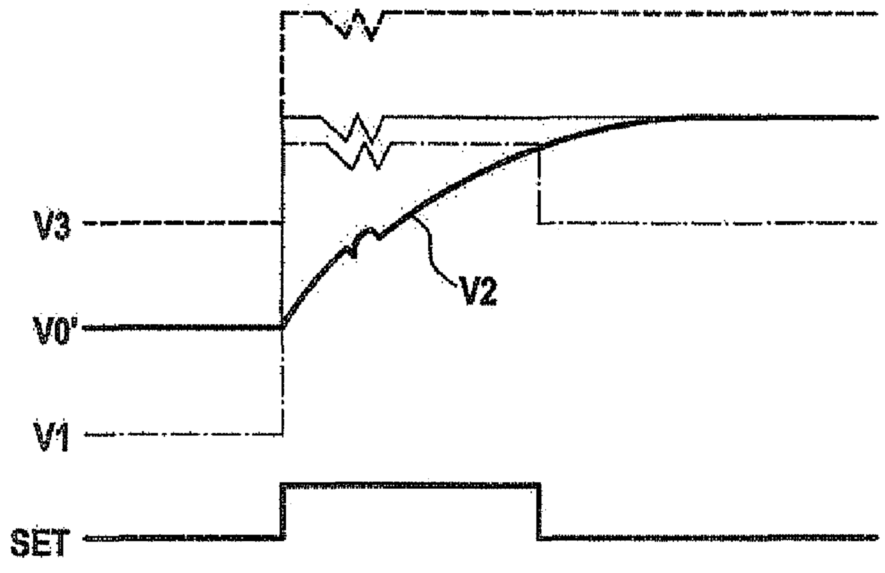

FIG. 3*c* shows a modulated signal V0', which is superposed by a short voltage dip. If output voltage V0' has already exceeded/undershot the trigger threshold value, the threshold is adjusted in such a way that the interferences having a small amplitude do not influence the comparator. One may clearly recognize that, because of the increase in threshold value V1, the receiving signal of the comparators, V2, is at a clear distance from the former, so that no erroneous results are generated. Compared to FIG. 3*b*, it may be seen in FIG. 3*c* that the influencing of an interference signal is able to be prevented solely by the dimensioning of the low-pass filter (which defines the curve of V2) and by the definition of the abrupt level change of the two threshold values V1 and V3. Because of the dimensioning of the corresponding components or the glitch filters, the electromagnetic compatibility of the transmission may thus be increased.

Figure 3D:
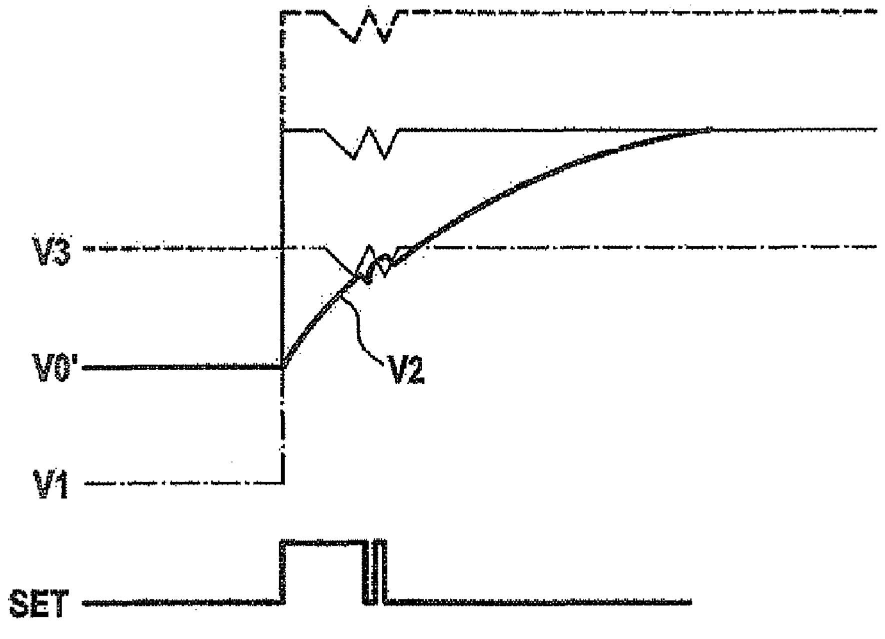

FIG. 3*d* shows an additional event, a short voltage rise of the voltage of O' being followed by a short voltage dip conditioned by interferences. Voltage V2 increases several times the associated threshold value in the vicinity of the small subsequently situated interference, so that a non-debounced SET signal is yielded. It is quite simply obvious that a subsequently situated glitch filter is able to filter the SET signal shown and render a debounced output signal, which correctly reflects the essential curve of V0', i.e., the rising edge.

Figure 4:
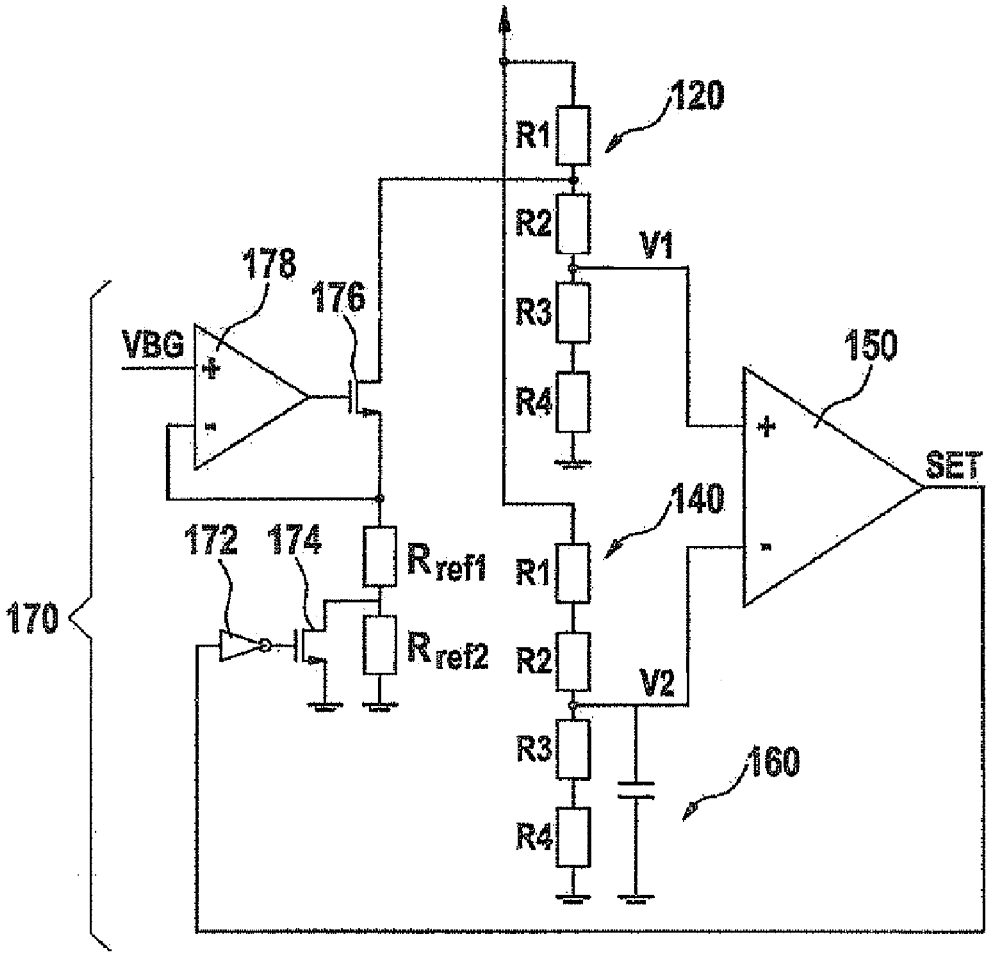
FIG. 4 shows a circuit example for a threshold value generator according to the present invention.

FIG. 4 shows a circuit which represents a preferred specific embodiment of a threshold value generator in detail. The circuit of FIG. 4 includes an high comparator 150 and an associated high voltage divider 120 connected to it. Receiving signal V2 is provided by a low-pass filter 160 which, in a known manner, is developed together with a voltage divider 140. The two voltage dividers are connected between the supply potential and ground. High threshold value generator 170 receives the output signal of comparator 150, i.e. the SET signal, which is fed back via an inverter 172 and a MOSFET driver stage. Driver stage 174 is connected to a voltage divider made up of two reference resistors $R_{ref1}$ and $R_{ref2}$, or rather, at their linkage point. One of the reference resistors, $R_{ref2}$, is connected to ground, whereas the other reference resistor $R_{ref1}$ is connected via a second driver stage 176 to high voltage divider 120 or the tapping feedback. Driver stage 176 is controlled by a feedback operational amplifier 178, at whose non-inverted input a bandgap voltage VBG is present. This is able to be generated simply via a usual p-n junction. The activating point of the current source of the high threshold value generator thereby refers to an absolute voltage VBG, which is defined by associated components, but not by the modulated supply voltage. The degree of influence on the associated threshold value could be changed, on the one hand, via VBG and, on the other hand, via the two reference resistors $R_{ref1}$ and $R_{ref2}$. In other words, the amount by which the threshold value is raised or lowered is able to be adjusted by the value of resistors $R_{ref1}$, $R_{ref2}$, their ratio to each other, and by VBG and by the properties of transistors 174 and 176. As has already been noted, the amount, by which the threshold value is raised or lowered, should refer to the level swing of the modulated upon voltage, the amount, by which the threshold value is raised or lowered, preferably corresponding to 40-45% of the modulated upon signal, which, for example, is a signal having two different levels, that is, a binary signal and a voltage swing between the two levels of 3 V, for example. Transistor 176 and the two reference resistors $R_{ref1}$ and $R_{ref2}$ together with operational amplifier 178 form a voltage-to-current converter.

The associated supply voltage amounts to 12 V (nominal), for instance, but may fluctuate between 6 V and 30 V, depending on the charge state of the battery and the signal charging current of the generator. For comparison, an operational amplifier is preferably used.

In the description of these example embodiments, the individual components provided with the prefixes low and high are allocated by this prefix to the rising edge (high), i.e., the edge leading to the high level, and the falling edge (low), i.e., the edge leading to the low level. Consequently, the allocation does not relate to an allocation with respect to a level of the modulated signal, but is used for characterizing the associated clock pulse edge that is to be recorded, which leads to the respective level or precedes it. Besides modulation signals in which both clock pulse edges play an important part, modulated signals may also be recorded, using the method according to the present invention, in which only one edge, such as the rising edge, is relevant.

What is claimed is:

1. A receiving stage for a multi-stage signal modulated upon a supply voltage, comprising:

a supply potential terminal;

a ground potential terminal;

a low-pass filter having an input connected to the supply potential terminal and the ground potential terminal, and having an output arranged to output a low-pass filter output signal;

a high comparator having a high threshold value, an output, and a receiving signal input connected to the output of the low-pass filter and arranged to receive the low-pass filter output signal;

a low comparator having a low threshold value, an output, and a receiving signal input connected to the output of the low-pass filter and is arranged to receive the low-pass filter output signal;

a high threshold value generator arranged to raise the high threshold value when the low-pass filter output signal is less than the high threshold value, and to lower the high threshold value when the low-pass filter output signal is greater than the high threshold value; and a low threshold value generator arranged to raise the low threshold value when the low-pass filter output signal is less than the low threshold value, and to lower the low threshold value when the low-pass filter output signal is greater than the low threshold value.

2. The receiving stage as recited in claim 1, further comprising:

a high voltage divider circuit;

a low voltage divider circuit; and a low-pass filter voltage divider circuit;

wherein the high comparator includes a high threshold value input, the high threshold value input and the high threshold value generator being connected to the high voltage divider circuit; and wherein the low comparator includes a low threshold value input, the low threshold value input and the low threshold value generator being connected to the low voltage divider circuit; and wherein the input of the low-pass filter is connected to the low-pass filter voltage divider circuit; and wherein each of the voltage divider circuits is connected between the supply potential terminal and the ground potential terminal to divide the voltage difference lying between the supply potential terminal and the ground potential terminal.

3. The receiving stage as recited in claim 1, further comprising:

one of a storage element, a clock-pulsed or a non-clock-pulsed flip-flop, an RS flip-flop, a JK flip-flop, a D flip-flop or a T flip-flop, directly connected to the output of the high comparator and to the output of the low comparator, via one of: i) a logical combination circuit, ii) a compensation circuit for adjusting potential differences or signal propagation times, or iii) two glitch filters, of which one is connected between the output of the high comparator and the storage element and the other is connected between the output of the low comparator and the storage element.

4. The receiving stage as recited in claim 1, wherein the high comparator and the low comparator each has a non-inverted and an inverted input and is a comparator or as an operational amplifier, the receiving signal input of the high comparator corresponding to the inverted input of the high comparator and the receiving signal input of the low comparator corresponding to the non-inverted input of the high comparator.

5. The receiving stage as recited in claim 1, wherein the high threshold value generator has a high feedback circuit that is connected to the output of the high comparator, and which has a digital or an analog driver stage, a controllable current source or a controllable voltage source, and including a high coupling circuit which is connected to the high comparator, the high coupling circuit being arranged to provide the high threshold value of the high comparator; and wherein the low threshold value generator has a low feedback circuit that is connected to the output of the low comparator, and which has a digital or an analog driver stage, a controllable current source or a controllable voltage source, and including a low coupling circuit which is connected to the low comparator, the low coupling circuit being arranged to provide the low threshold value of the low comparator.

6. The receiving stage as recited in claim 1, wherein the comparators are each connected to a voltage divider circuit which is connected between the supply potential terminal and the ground potential terminal, and the voltage divider circuits each include a tapping feedback and a threshold value tapping that is different from it, and wherein the tapping feedback of the two voltage divider circuits is connected in each case via a feedback loop to the output of the associated comparator, the threshold value tapping of the two voltage divider circuits is connected directly to a threshold value input of the associated comparator which defines the associated threshold value of the respective comparator, the voltage divider circuit of the low comparator being connected to an inverted input of the low comparator, and the receiving signal input of the low comparator corresponds to a non-inverted input of the low comparator, and the voltage divider circuit of the high comparator is connected to a non-inverted input of the high comparator, and the receiving signal input of the high comparator corresponds to an inverted input of the high comparator.

7. The receiving stage as recited in claim 1, wherein the low-pass filter has a capacitor having a connected series resistor and a connected parallel resistor, the capacitor and the parallel resistor being connected to the ground potential terminal, the series resistor being connected to the supply potential terminal, and a tapping which includes the connection between the parallel resistor, the capacitor and the series resistor being connected to the receiving signal input of the high comparator and to the receiving signal input of the low comparator, the low-pass filter having a time constant which is of the order of magnitude of a pulse width of the modulated signal.

8. The receiving state as recited in claim 7, wherein the time constant is, at maximum, one of 10%, 20%, 30%, 50%, 75%, 100%, 150% or 200% of the pulse width.

9. A method for receiving a multi-stage signal that is modulated upon a supply voltage, comprising:

recording a terminal voltage;

low-pass filtering the terminal voltage so as to provide a low-pass filter signal;

comparing the low-pass filter signal to a high threshold value and to a low threshold value and outputting a result of the comparison to the high threshold value and to the low threshold value; and adjusting the threshold value including raising the low threshold value if the low-pass filter signal is less than the low threshold value, lowering the high threshold value if the low-pass filter signal is greater than the high threshold value, raising the high threshold value if the low-pass filter signal is less than the high threshold value, and lowering the low threshold value if the low-pass filter signal is greater than the low threshold value.

10. The method as recited in claim 9, wherein the adjusting includes combining the terminal voltage with the results of the comparison via a combination circuit or a voltage divider circuit and providing the high threshold value and the low threshold value as a combination of the terminal voltage with the respective results of the comparison.

11. The method as recited in claim 9, further comprising:

storing the results of the comparison in a storage element, which furthermore logically links with one another the stored results of the comparison and stores the linked result.

* * * * *